(12) United States Patent
Bacardit

(10) Patent No.: US 6,195,994 B1
(45) Date of Patent: Mar. 6, 2001

(54) MASTER CYLINDER WITH HYDRAULIC REACTION OPERATING WITH DEVELOPING PRESSURE

(75) Inventor: Juan Simon Bacardit, Drancy (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,785

(22) PCT Filed: Jul. 13, 1999

(86) PCT No.: PCT/FR99/01733

§ 371 Date: Aug. 20, 1999

§ 102(e) Date: Aug. 20, 1999

(87) PCT Pub. No.: WO00/07860

PCT Pub. Date: Feb. 17, 2000

(30) Foreign Application Priority Data

Aug. 4, 1998 (FR) .................................................. 98 09979

(51) Int. Cl.[7] .................................................. B60T 13/573
(52) U.S. Cl. .................................................. 60/553
(58) Field of Search .................................................. 60/552, 553

(56) References Cited

U.S. PATENT DOCUMENTS

| 5,735,124 | * | 4/1998 | Cords et al. | 60/553 X |
| 5,921,084 | * | 7/1999 | Gautier et al. | 60/553 |
| 6,076,351 | * | 6/2000 | Sacristan | 60/553 |

* cited by examiner

Primary Examiner—John E. Ryznic
(74) Attorney, Agent, or Firm—Leo H McCormick, Jr.; Warren Comstock

(57) ABSTRACT

The invention relates to a master cylinder with hydraulic reaction, comprising a working chamber (12) in which there slides a hollow main piston (13) inside which a reaction piston (14) delimits a reaction chamber (15) which communicates with the working chamber (12) through at least one non-return valve (22).

According to the invention, the non-return valve (22) is installed on a floating stepped piston (23) using the kind of assembly used in brake pressure regulators, so as to limit the reaction force applied to the reaction piston (15).

3 Claims, 2 Drawing Sheets

MASTER CYLINDER WITH HYDRAULIC REACTION OPERATING WITH DEVELOPING PRESSURE

The present invention relates to a master cylinder with hydraulic reaction, comprising: a cylindrical body delimiting a variable-volume working chamber full of brake fluid; a main piston mounted to slide selectively in the working chamber in a first axial direction to reduce the volume of this working chamber; an axial bore pierced in the main piston and delimiting a variable-capacity reaction chamber subjected to a variable pressure; a reaction piston closing the reaction chamber and mounted to slide selectively in the axial bore in the first axial direction to reduce the capacity of the reaction chamber; and a non-return valve selectively allowing fluid to flow from the reaction chamber towards the working chamber.

A master cylinder of this type is incorporated into the braking device described in the prior art in Patent EP-0,662,894.

Such a braking device has the advantage of optimizing the intensity of the braking force in the event of an abrupt application of the brakes, particularly by delaying the rise in reaction force opposing this braking force.

More recently, in brake system design, there has developed a preoccupation with being able to vary the reaction force in inverse proportion to the braking effort, so as to optimize the use of the braking energy exerted by the driver in the event of intense braking.

The present invention falls within this context and is intended to provide a master cylinder with hydraulic reaction that is of simple structure and offers this feature.

To this end, the master cylinder of the present invention, which in other respects is in accordance with the generic definition given in the above preamble, is essentially characterized in that it comprises a stepped piston mounted so that it can float in the axial bore between the reaction chamber and the working chamber, and sliding in the first axial direction against a spring whose length decreases, as the variable pressure increases, in that the stepped piston delimits in a leaktight fashion, within the axial bore, an annular chamber subjected to a low pressure, and in that the non-return valve is installed on an axial drilling passing through the stepped piston, this non-return valve being open or closed according to whether the length of the spring is at least equal to a predetermined minimal distance, or less than this minimal distance.

The stepped piston preferably has a section of smaller relative diameter, facing towards the working chamber, and a section of larger relative diameter, facing towards the reaction chamber.

In an advantageous embodiment of the invention, the non-return valve comprises a valve seat defined on a shoulder of the axial drilling in the stepped piston, a shut-off member urged elastically towards the seat in a second axial direction which is the opposite of the first axial direction, and a needle which is stationary with respect to the main piston, and one end of which points in the first axial direction for selectively moving the shut-off member away from the valve seat when the length of the spring is at least equal to the predetermined minimal distance.

Other features and advantages of the invention will emerge clearly from the description thereof given hereafter with no implied limitation, with reference to the appended drawings in which.

Figure 1:
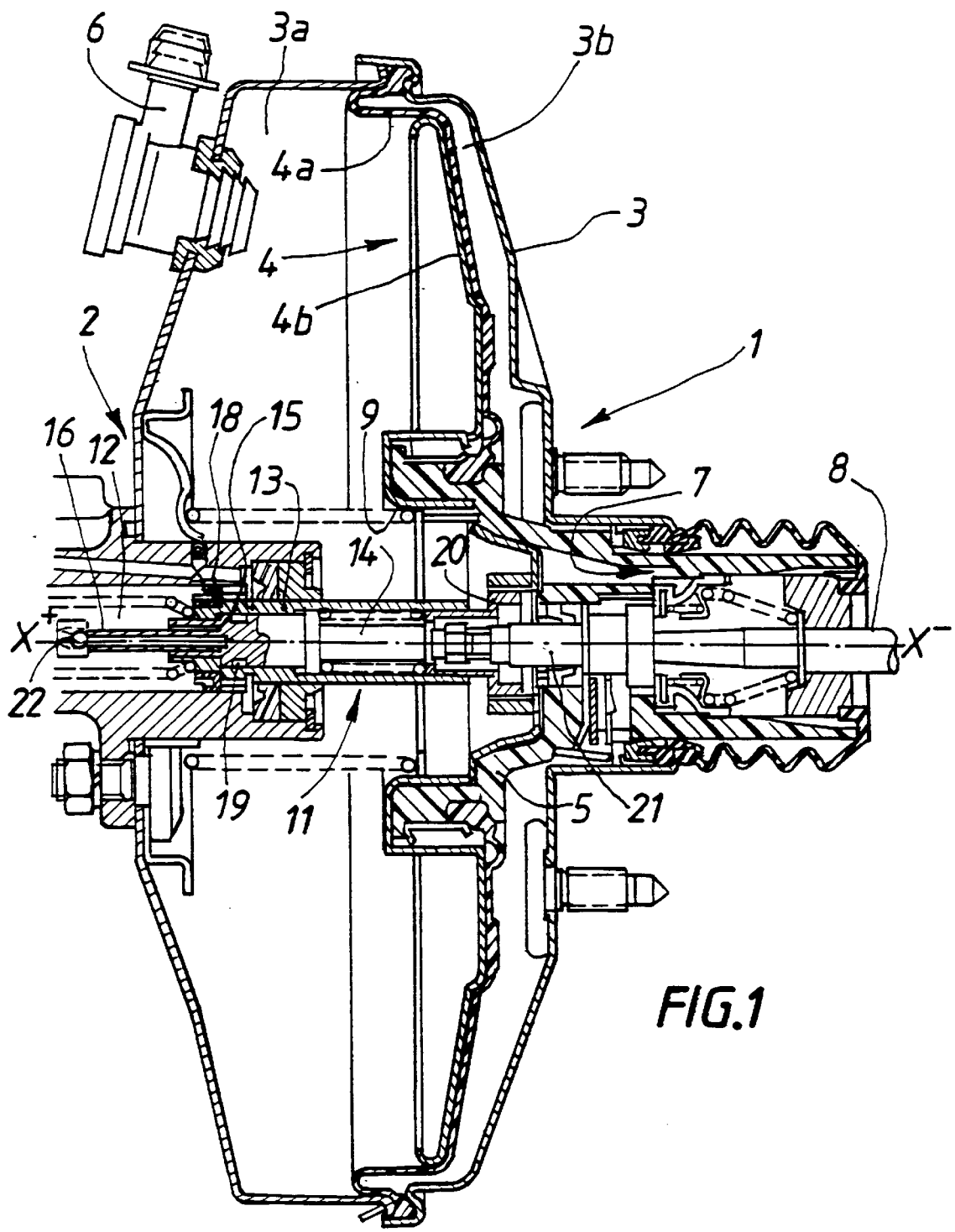
FIG. 1 is a sectional view of the known braking device described in the aforementioned Patent EP 0,662,894.

The prior-art Patent EP-0,662,894 describes a braking system which, broadly speaking, comprises a pneumatic brake booster 1 and a master cylinder 2.

The booster itself comprises a rigid casing 3 divided into two chambers 3a and 3b in a leaktight fashion by a moving partition 4 comprising a diaphragm 4a and a rigid skirt 4b capable of driving along a pneumatic piston 5 that can move inside the casing 3.

The front chamber 3a, the front face of which is closed in a leaktight fashion by the master cylinder 2, is permanently connected to a source of partial vacuum (not depicted) via a connection 6.

The pressure in the rear chamber 3b is controlled by a pneumatic valve 7, operated by an operating rod 8, which is connected to a brake pedal (not depicted).

When the operating rod 8 is in a position of rest, in this case towards the right, the pneumatic valve 7 establishes a communication between the two chambers 3a and 3b of the booster.

As the rear chamber 3b is then subjected to the same partial vacuum as the front chamber 3a, the piston 5 is pushed back towards the right, into the position of rest, by a spring 9.

Actuating the operating rod 8 towards the left has the effect, first of all, of shifting the pneumatic valve 7 in such a way that it isolates the chambers 3a and 3b from one another and then, secondly, of shifting this pneumatic valve in such a way that it opens the rear chamber 3b to atmospheric pressure.

The difference in pressure between the two chambers which is now felt by the diaphragm 4a, exerts on the moving partition 4 a thrust which tends to shift it towards the left and allow it to drive along the piston 5 which in turn shifts, compressing the spring 9.

The braking effort exerted on the operating rod 8, or "input force" and the brake-boosting effort, or "boost force" resulting from the thrust of the moving partition 4, are then applied together in the axial direction X–X+ of the push rod 8, in the direction of the master cylinder 2, and they combine to form the actuating force of the latter.

More specifically, the actuating force is applied to the pistons assembly 11 of the master cylinder and causes it to shift to the left (in FIG. 1) in the axial direction X–X+, and this leads to a rise in pressure of the brake fluid present in the working chamber 12 of the master cylinder, and to actuation of the brake connected to this chamber.

The piston assembly 11 is in fact composite and comprises a main piston 13 pierced with an axial bore 130 closed in a leaktight fashion by a reaction piston 14 and an annular seal 19.

The reaction piston 14 is mounted to slide in the bore 130, in the axial direction X–X+, and against the force exerted by a spring 24. This piston 14 delimits in the bore 130 a reaction chamber 15 which communicates with the working chamber 12 via a nonreturn valve 22 and possibly, in the embodiment illustrated in FIG. 2, through a duct 120 formed by a front part of the bore 130.

As described in Patent EP-0,662,894, the non return valve 22 has the function of selectively allowing brake fluid to flow from the reaction chamber 15 towards the working chamber 12.

Apart from the passage of fluid allowed by the non-return valve 22 between the working chamber 12 of the master cylinder 2 and the reaction chamber 15, the main piston 13 slides in a leaktight fashion in the master cylinder 2, sealing being obtained by means at least of an annular seal 18 (FIG. 1).

The main piston 13 is connected, via the ring 20, to the rigid skirt 4b so as to receive at least part of the boost force exerted via this skirt.

Figure 2:
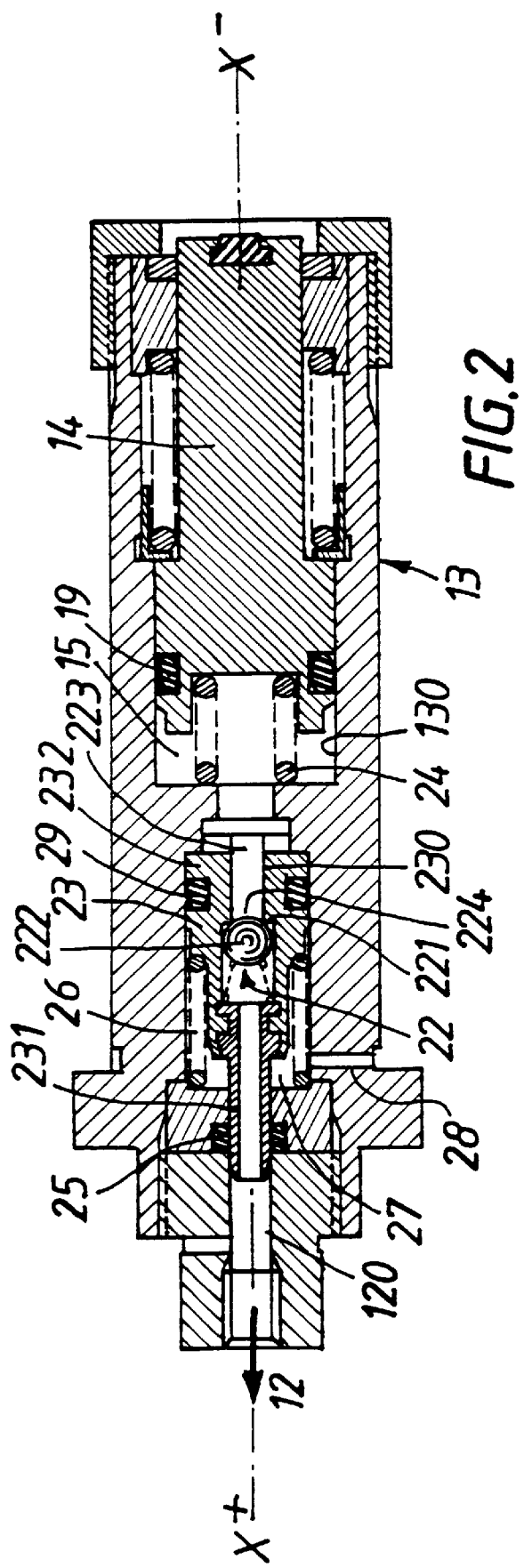
FIG. 2 is a sectional view through the specific members of the master cylinder of the invention.

The reaction piston 14 for its part is arranged axially facing a push rod 21 capable of transmitting to it at least the input force exerted on the operating rod 8 towards the left in FIGS. 1 and 2.

The master cylinder according to the invention furthermore comprises a stepped piston 23, mounted so that it can float in the axial bore 130 between the reaction chamber 15 and the working chamber 12 and sliding in a direction liable to compress a spring 26 when the brake is actuated, in other words, in the axial direction X–X+.

The stepped piston 23 delimits in a leaktight fashion, within the axial bore 130, an annular chamber 27 subjected to a low pressure, and for example placed in communication with the inside of the booster by a passage 28.

The non-return valve 22 is installed on an axial drilling 230 passing through the stepped piston 23, this non-return valve 22 being open or closed according to the state of extension of the spring 26.

As FIG. 2 shows, the stepped piston 23 has a section of smaller relative diameter 231, facing towards the working chamber 12 and sliding in a leaktight fashion in the bore 130 by virtue of an annular seal 25, and a section of larger relative diameter 232, facing towards the reaction chamber 15 and sliding in a leaktight fashion in the bore 130 by virtue of an annular seal 29.

The non-return valve comprises, for example, a valve seat 221 defined on a shoulder of the axial drilling 230 in the stepped piston 23, a ball 222 urged elastically towards the seat in the axial direction X+X– which is the opposite of the axial direction of actuation X–X+, and a needle 223 which is stationary with respect to the main piston 13 and one end 224 of which points in the axial direction of actuation X–X+ in order to move the ball 222 away from its seat 221 when the length of the spring 26 is sufficient to allow the ball to be moved by the end of the needle, that is to say as long as the pressure in the reaction chamber remains relatively moderate.

The way in which the master cylinder of the invention works is as follows.

Figure 3:
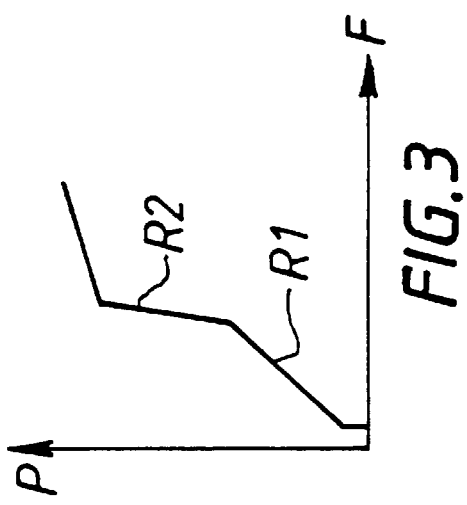
FIG. 3 is a diagram depicting the change, as a function of input effort applied to the reaction piston, in the hydraulic pressure supplied by a master cylinder in accordance with the invention, built into a pneumatic brake booster.

As long as the input force F applied to the reaction piston 14 is relatively weak, the non-return valve 22 remains open, which means that the pressure in the reaction chamber 15 changes as the pressure in the working chamber 12, this situation being illustrated by the regime R1 in FIG. 3.

As the pressure in the reaction chamber 15 increases, the force of hydraulic origin acting on the stepped piston 23 increases, which means that the piston shifts in the axial direction of actuation X–X+, compressing the spring 26.

When the spring 26 has reached a predetermined degree of compression, the end 224 of the needle 223 stops pressing against the ball 222, which means that the non-return valve 22 closes again. This situation is illustrated in FIG. 3 by the regime R2, which differs from the regime R1 in that a very small increase in input force F causes a substantial rise in the pressure P of the brake fluid.

What is claimed is:

1. Master cylinder with hydraulic reaction, comprising: a cylindrical body (2) delimiting a variable-volume working chamber (12) full of brake fluid; a main piston (13) mounted to slide selectively in the working chamber (12) in a first axial direction (X–X+) to reduce the volume of this working chamber; an axial bore (130) pierced in the main piston (13) and delimiting a variable-capacity reaction chamber (15) subjected to a variable pressure; a reaction piston (14) closing the reaction chamber (15) and mounted to slide selectively in the axial bore (130) in the first axial direction (X–X+) to reduce the capacity of the reaction chamber (15); and a non-return valve (22) selectively allowing fluid to flow from the reaction chamber (15) towards the working chamber (12), characterized in that it comprises a stepped piston (23) mounted so that it can float in the axial bore (130) between the reaction chamber (15) and the working chamber (12), and sliding in the first axial direction (X–X+) against a spring (26) whose length decreases, as the variable pressure increases, in that the stepped piston (23) delimits in a leaktight fashion, within the axial bore (130), an annular chamber (27) subjected to a low pressure, and in that the non-return valve (22) is installed on an axial drilling (230) passing through the stepped piston (23), this non-return valve (22) being open or closed according to whether the length of the spring is at least equal to a predetermined minimal distance, or less than this minimal distance.

2. Master cylinder according to claim 1, characterized in that the stepped piston (23) has a section (231) of smaller relative diameter, facing towards the working chamber (12), and a section (232) of larger relative diameter, facing towards the reaction chamber (15).

3. Master cylinder according to claim 1 or 2, characterized in that the non-return valve (22) comprises a valve seat (221) defined on a shoulder of the axial drilling (230) in the stepped piston (23), a shut-off member (222) urged elastically towards the seat (221) in a second axial direction (X–X–) which is the opposite of the first axial direction, and a needle (223) which is stationary with respect to the main piston (13), and one end (224) of which points in the first axial direction (X–X+) for selectively moving the shut-off member (222) away from the valve seat (221) when the length of the spring is at least equal to the predetermined minimal distance.

* * * * *